(12) United States Patent
Goldfield et al.

(10) Patent No.: US 7,865,829 B1
(45) Date of Patent: Jan. 4, 2011

(54) PROVIDING SOFTWARE APPLICATION HELP BASED ON HEURISTICS

(75) Inventors: Garrett R. Goldfield, Encinitas, CA (US); William K. Scarvie, III, San Diego, CA (US); David Murray, Carlsbad, CA (US); Todd Haseyama, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 1279 days.

(21) Appl. No.: 10/751,194

(22) Filed: Dec. 31, 2003
(Under 37 CFR 1.47)

(51) Int. Cl.
*G06F 3/00* (2006.01)

(52) U.S. Cl. .................. 715/708; 715/709; 715/712; 715/713

(58) Field of Classification Search .......... 715/705–715
See application file for complete search history.

(56) References Cited

U.S. PATENT DOCUMENTS

| | | | |
|---|---|---|---|
| 4,905,163 A * | 2/1990 | Garber et al. ............. | 706/55 |
| 4,964,077 A * | 10/1990 | Eisen et al. ............. | 715/707 |
| 5,239,617 A | 8/1993 | Gardner et al. | |
| 5,485,544 A | 1/1996 | Nonaka et al. | |
| 6,233,570 B1 | 5/2001 | Horvitz et al. | |
| 6,262,730 B1 | 7/2001 | Horvitz et al. | |
| 6,300,950 B1 * | 10/2001 | Clark et al. ............. | 715/705 |
| 7,194,685 B2 * | 3/2007 | Morrison ............. | 715/705 |
| 2002/0015056 A1 * | 2/2002 | Weinlaender ............. | 345/705 |

* cited by examiner

*Primary Examiner*—Ba Huynh
(74) *Attorney, Agent, or Firm*—Osha • Liang LLP

(57) ABSTRACT

Help information for a software application is provided based on a user help knowledge base. The user help knowledge base includes a user help profile indicating help information previously selected by the user. Examples of data tracked for the previously selected help information include the application context in which it selected, a presentation mode in which it was presented, at least one associated help topic, and a help content format. The user help knowledge base can further comprise a user profile maintained by the software application. Based on the information in the user help knowledge base, as well as the current context of the application and/or user data entered, the help module selects help information pertinent to the user and the current context of the application. A presentation mode, for example a video mode, an audio mode or a display mode, is selected for the help information as well based on the user help knowledge base.

24 Claims, 10 Drawing Sheets

PROVIDING SOFTWARE APPLICATION HELP BASED ON HEURISTICS

FIELD OF THE INVENTION

The present invention generally relates to help features provided for a software application, an example of which is a web application.

BACKGROUND

A user-interactive software application typically has help features to aid in the solution of problems and errors, to assist a user in understanding the operation of the application or the processing of user information by the application, and to provide help about the task the user is trying to do with the application (e.g. file taxes, trade securities, research medical information, etc.). Examples of user-interactive programs are tax preparation applications, on-line securities trading applications, on-line purchasing applications, employee benefits websites, medical information websites, or on-line rental applications. Different users obtain help information for the application through different help access mechanisms. Some prefer to enter data for a search inquiry. Some prefer to traverse menus from a tool bar. Some prefer to access a stand-alone help application related to the main software application. Users also differ in their preferences for presentation of the help information. Some prefer to view a video on a topic while others prefer an online electronic message exchange with a human being. Others prefer simple text explanations.

Furthermore, a user may use an application infrequently enough that they are likely to need assistance with the same help items previously selected. Examples of such applications include a tax preparation application or an employee benefits software package which many users use only once a year. Furthermore, changes within the user's circumstances result in changes in the user's input data to the application resulting in different execution paths and data outputs. The selection of help information provided to a user can greatly assist the user in understanding the effects of the change in input data in the areas related to the application (e.g. effect on taxable income) or to get to the pertinent portions of the application more quickly to achieve a task (e.g., perform a stock purchase.)

It is desirable to provide help information based on the user's previous selections, to automatically provide the user with helpful information that is pertinent to the user's needs and to present the help information in the user's preferred mode of presentation.

SUMMARY OF THE INVENTION

The present invention provides various embodiments for providing help information for a software application to a user based on help information previously selected by the user including an embodiment of a computer-implemented method for providing help information for a software application comprising selecting help information for presentation to a user based on help information previously selected by the user. In one example, a user help knowledge base comprises information indicating help information previously selected by the user. This information assists in identifying a user's preferences in obtaining help information. Examples of information included in the user help knowledge base can include topics for which the user has selected help previously, content formats for the previously selected help information, and presentation modes of the previously selected help information. In one embodiment of the method, the user help knowledge base comprises a user help profile indicating help information previously selected by the user. In this embodiment, the user help knowledge base can further comprise a user application profile that is maintained by the software application.

In one example, the help information for the software application is organized into help files. In one example, the user help profile comprises at least one data entry for a user selection of a help information file, the data entry including the following data: the application context in which the help file is selected, an identifier of the help file selected, a presentation mode in which the help file was presented, at least one help topic associated with the help file, and a help content format of the file.

The embodiment of the computer-implemented method can also select help information for presentation to the user based on the current application context in addition to the help information previously selected by the user. In one example, the current application context is the portion of the application currently executing. In another embodiment, the computer-implemented method further comprises determining a presentation mode of the help information based on a presentation mode of help information previously selected by the user. Examples of a presentation mode include a video mode, an audio mode or a display mode for presenting help information in a textual or graphical form. A presentation mode can also be a combination of any of these modes as well. For example, a video presented on a web page typically includes an audio portion.

The present invention provides an embodiment of a computer-implemented system of providing help information for a software application based on help information previously selected by a user including memory for storing information indicating help information previously selected by a user, a help module for selecting help information for presentation to a user based on the information indicating help information previously selected by the user wherein the help module is communicatively coupled to the memory and an application module with which the help module exchanges user data. In this embodiment, the help module can select help information on the additional basis of the current application context. In one embodiment, a user knowledge base stored in memory comprises the information indicating help information previously selected by the user. In another embodiment the help module further includes logic for determining a presentation mode of the selected help information based on the presentation modes of the help information previously selected by the user. The system embodiment can further comprise help rules stored in memory which the help module applies for the selection of help information. The system embodiment can further comprises a user interface module communicatively coupled to the help module for formatting user interface displays including the selected help information in the determined presentation mode.

The one or more embodiments of the present invention can also be embodied as instructions stored or transmitted in one or more computer-usable mediums some examples of which are a memory, a disk, a compact disc, a field programmable gate array, a flash card or an integrated circuit, a wire, a wireless connection, or a data transmission. The one or more embodiments of the present invention can also be embodied as software in a computer program product.

DETAILED DESCRIPTION OF THE DRAWINGS

Figure 1:
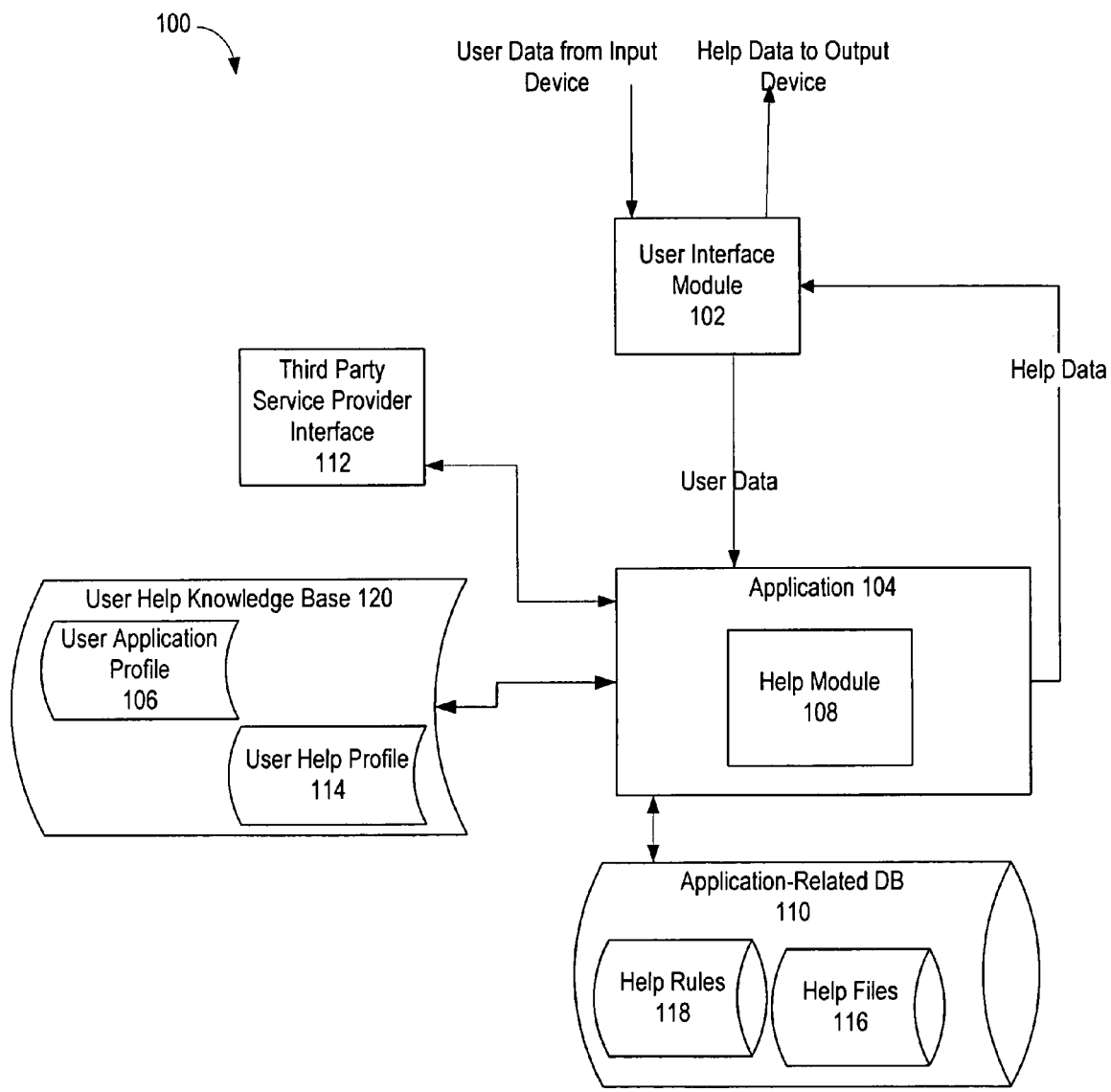
FIG. 1 illustrates a computer-implemented system for providing help information for a software application based on help information previously selected by a user in accordance with an embodiment of the present invention.

FIG. 1 illustrates a computer-implemented system 100 for providing help information for a software application based on help information previously selected by a user in accordance with an embodiment of the present invention. The system comprises a software application 104 including a help module 108, a user interface module 102, application-related data stored in a database 110 including help files 116 and help rules 118, user help knowledge base 120 including a user application profile 106 and a user help profile 114 and a third-party service provider interface 112. The application 104 is communicatively coupled to receive user data from the user interface module 102, which in one example is a browser. The user interface module 102 in turn receives the user data from an input device (not shown) examples of which include a touchscreen, a speech processing unit, a pointing device (e.g., a mouse or a stylus), or an alphanumeric input device (e.g, a keyboard, or a keypad). Examples of data that the user data can include are a request for help information or data responsive to a request generated from the application 104.

The user interface module 102 is communicatively coupled to receive help data from the help module 108 via the application module 104 for display on an output device (not shown) to which the user interface module 102 is communicatively coupled. Examples of an output device include a display screen such as a computer display screen, a television monitor, or a liquid crystal display, and a speaker for audio output.

In this embodiment, the help module 108 is illustrated as a sub-module of the application 104. The application module 104 communicates received user data to the help module 108. Both modules 104, 108 also have access to the application-related database 110 including help information organized, in this embodiment, in help files 116 and help rules 118. The database can also be stored in memory accessible to a processor executing both modules 104, 108.

Additionally, the application module 104 and the help module 108 have access to the user help knowledge base 120 including the user application profile 106 and the user help profile 114. Examples of data that can be stored in the user application profile 106 include user data previously entered that is pertinent to application processing. For example, in a tax application, information such as name, occupation, social security number, marital status and other information pertinent to filing a tax return is included in the user tax application profile. In an online purchase application or a securities trading application, a user credit card number and security information can be included. Other information can include previous application sub-modules accessed by the user, and third-party services accessed by the user through the application. An example of data that can be stored in the user help profile 114 is information indicating help information previously accessed responsive to user data associated with the user and attributes of that help information related to its content, presentation, and manner of access by the user. In one example, the user help profile 114 comprises at least one data entry for a user selection of a help file 116, the data entry including the following data: an identifier of the help file 116 selected, the portion of the application executing ("the application context") during which the help file 116 is selected, a presentation mode in which the help file 116 is presented, at least one help topic associated with the help file 116, and a help content format type of the file 116. The profiles 106, 114 can be stored in memory accessible to a processor executing the application module 104 and the help module 108.

Both modules can access information from third-party service providers through a communication interface 112. Examples of such information include third-party files for displaying their information in accordance with a web-based display language such as a Java script, HTML, XML, or a CGI script. An example of a communication interface is a network interface provided by a computer system in which the modules 104, 108 execute.

In this embodiment, the help module 108 selects one or more help files 116 for presentation based on the user help knowledge base 120 associated with a particular user and the application context. The application module 104 identifies the current application context for the user's process in a notification to the help module 108. In this example, the help module 108 applies the help rules 118 in selecting one or more help files 116.

In this embodiment, attributes of the help files 116 are stored with meta-data for each file. An example of an attribute of a help file 116 is at least one topic related to the application module 104 associated with this help file. Another example of a help file attribute is a help format type. An example of a help format type is Frequently Asked Questions (FAQs). Another example of a help file attribute is a presentation mode. An example of a presentation mode is a presentation mode. Examples of a presentation mode are a video mode, an audio mode or a display mode. Examples of video data formats that can be used for video help files include MPEG and JPEG. Examples of audio data formats that can be used for audio help files include MP-3, MIME and VML. Examples for a display mode include text displayed in a window, text displayed as part of a hyperlink, a diagram, a chart, a graph or other graphical form.

The system embodiment 100 of FIG. 1 can be implemented in various computer system environments, an example of which is a standalone desktop computer system including a processor with accessible memory (e.g., hard disk). Software implementing the application module 104 and the help module 108 can be executed from a server (not shown) (a web server supporting a website to which the user logs in) or can be temporarily downloaded to a user's client computer having a user interface module 102 and executed therein or be executed by a server component and a client component with which it interacts. The user help knowledge base 120 can be stored locally on the client computer or remotely in a memory accessible to the server or the user's client computer. The system embodiment 100 can operate in any computer environment in which the application module 104 and the help module 108 can receive user input and present help information based on the user help knowledge base 120. Examples of such computer environments include a desktop computer system, a cell phone, a laptop computer, a television system with an Internet connection, a personal digital assistant (PDA), and the like. One or more of the elements shown in FIG. 1 may be implemented in software, hardware, firmware, or any combination thereof and may be stored in, for example, a computer-usable medium such as a memory or in an integrated circuit. Although the elements are depicted as individual units for illustrative purposes, one or more of the elements can also be implemented in combination. Furthermore, in another embodiment, the help module 108 can be implemented separately from the application module 104, the help rules 118 and the help files 116 can be stored separately from the application-related database 110. In this embodiment, the help module 108 is communicatively coupled to the application 104, the application-related database 110, the user interface module 102, the third-party service provider interface 112, the help rules 118, the help files 116, and to memory comprising the data making up the logical components of the user help knowledge base 120 such as the user application profile 106 and the user help profile 114.

Figure 2:
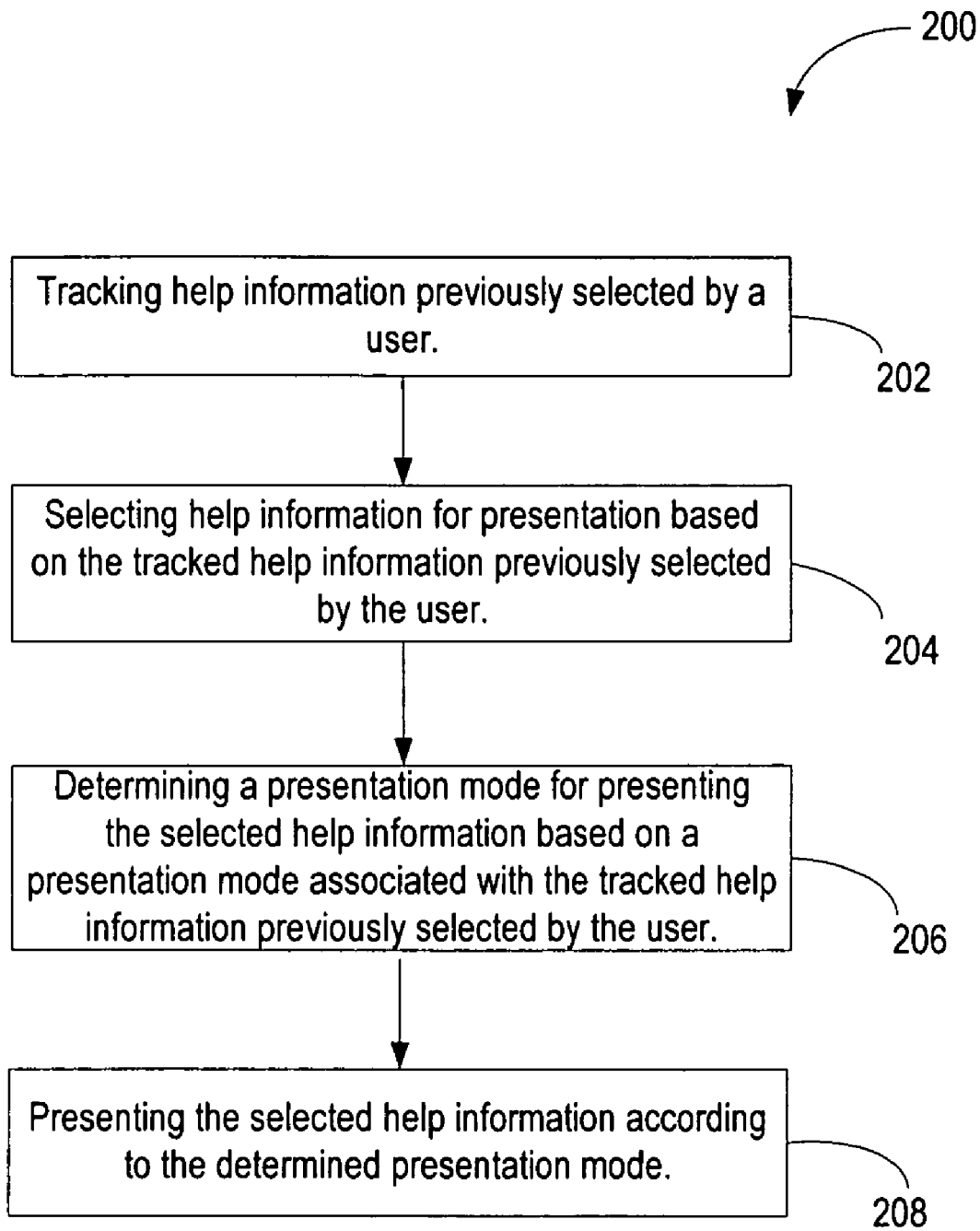
FIG. 2 illustrates a computer-implemented method for providing help information for a software application based on help information previously selected by a user in accordance with an embodiment of the present invention.

FIG. 2 illustrates a computer-implemented method 200 for providing help information for a software application based on help information previously selected by a user in accordance with an embodiment of the present invention. For illustrative purposes only, the method embodiment illustrated in FIG. 2 is discussed in the context of the system embodiment of FIG. 1. The help module 108 tracks 202 help information previously selected by a user and selects 204 help information (e.g., a help file 116) for presentation based on the tracked help information previously selected by the user. Furthermore, the help module 108 determines 206 a presentation mode for presenting the selected help information based on the presentation mode associated with the help information previously selected by the user. The help module 108 communicates to the user interface 102 the presentation modes of the selected help information, and the user interface module 102 presents 208 or causes to be presented the selected help information according to the determined presentation mode on the output device.

Figure 3A:
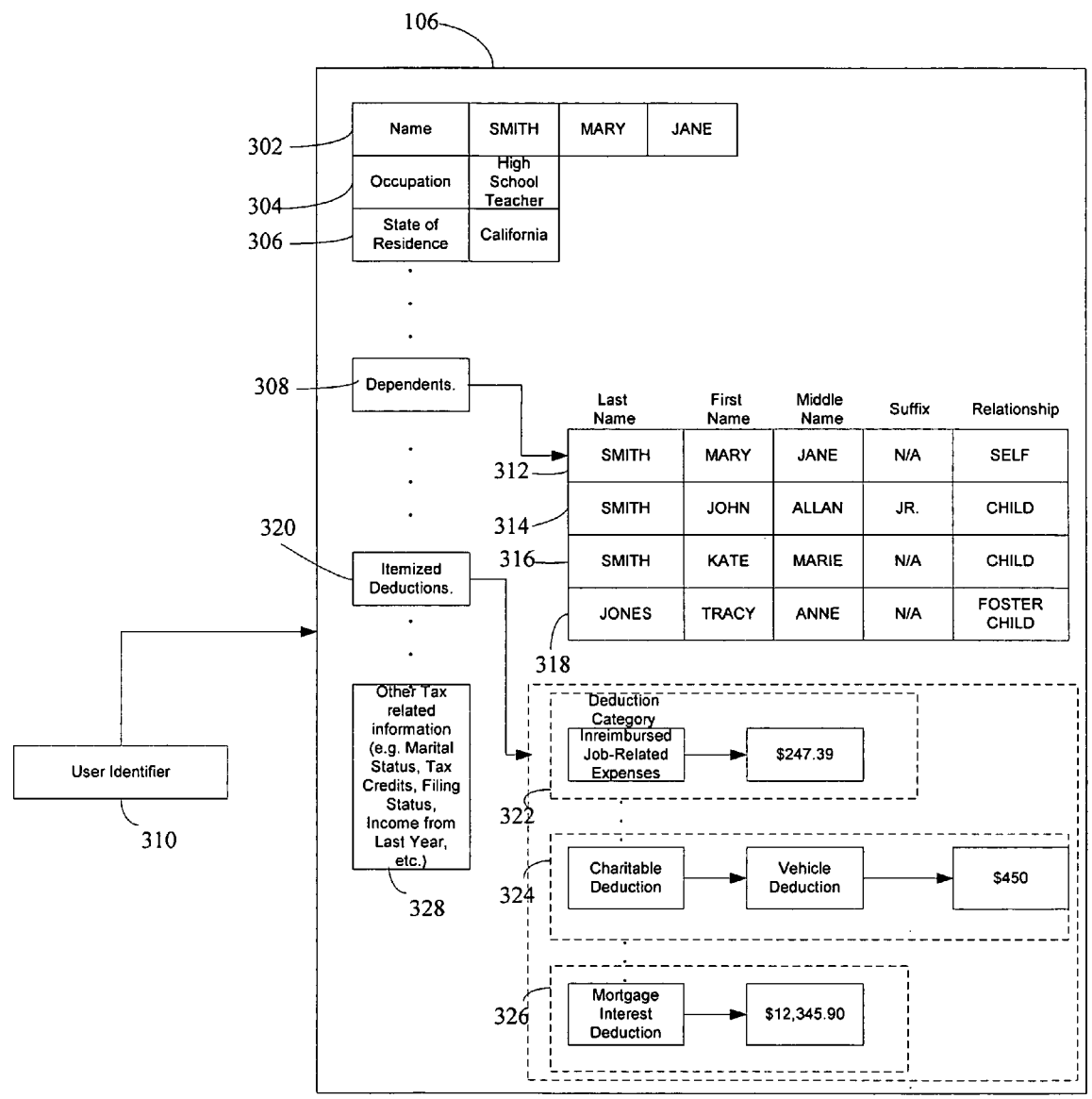
FIG. 3A illustrates an example of data tracked in a user application profile for a tax preparation software application in accordance with an embodiment of the present invention.

FIG. 3A illustrates an example of data tracked in a user application profile 106 for a tax preparation software application that is a part of a user help knowledge base 120 in accordance with an embodiment of the present invention. An example of a tax preparation software application is TurboTax®, a commercially available application from Intuit corporation. The user application profile 106 data can be stored as a file or a portion thereof stored on a computer-usable medium, examples of which include a hard drive, a removable storage medium such as a floppy disk, or a web-accessible database. The profile file can be saved and updated from year to year so that it can be used with different versions of the tax application from year to year.

In this example, data saved in a user application profile 106 includes information listed on a tax form as well as information used to determine tax consequences. Examples of typical data included in the user application profile 106 are the user's name 302, occupation 304, and state of residence 306. The application 104 associates a user identifier 310 with a user. The user identifier 310 for Mary Jane Smith keys into her user application profile 106 which indicates her occupation as high school teacher, and that she resided in California for the previous tax year. Other data typically included in the user application profile 106 for the tax application are dependents 308 for income tax purposes. In the illustrated example, there are four entries 312, 314, 316 and 318 for dependents. Each entry includes a field for a last, first and middle name as well as a suffix. Additionally, each entry comprises the relationship of the dependent to the user. The first entry 312 indicates Mary Jane Smith as a dependent with a relationship of self. Two other dependent entries 314, 316 identify John Allan Smith, Jr. and Kate Marie Smith as dependents with the relationship of child to Mary Jane. The fourth entry 318 indicates that Tracy Anne Jones, having a relationship of foster child, is also listed as a dependent of Mary Jane Smith.

Another example of data for the user application profile 106 are itemized deductions 320. Examples 322, 324, 326 of itemized deduction information for Mary Jane Smith are also illustrated. In this example, each deduction 322, 324, 326 is associated with at least one deduction category which can be used to cross-reference to particular help files 116 associated with these types of itemized deductions. An entry 322 of $247.39 under the deduction category of unreimbursed job expenses is included in Mary Jane's user application profile 106. Another entry 324 under the deduction category of charitable contributions and the sub-category of vehicle deduction is included for $450 for the old car Mary donated to charity. Another entry 326 under the deduction category of mortgage interest is also included in Mary's user application profile 106 for the amount $12,345.90. As indicated, other tax related information 328 such as marital status, tax credits, filing status and income from last year can also be included in the user application profile 106 for use in conjunction with the application 104 embodied as a tax preparation application and help module 108 embodied as a tax help module. The help module 108 can also personalize help content for the user based on the user application profile 106. For example, the help module 108 can imbed the names of Mary Jane Smith's dependents in the help solutions presented to her for a more personalized help experience. In another example, if Mary Jane indicated she was blind in the user data entered for her tax return, then the help module 108 automatically presents help content for Mary Jane in an audio mode as can be indicated by a help rule 118.

Figure 3B:
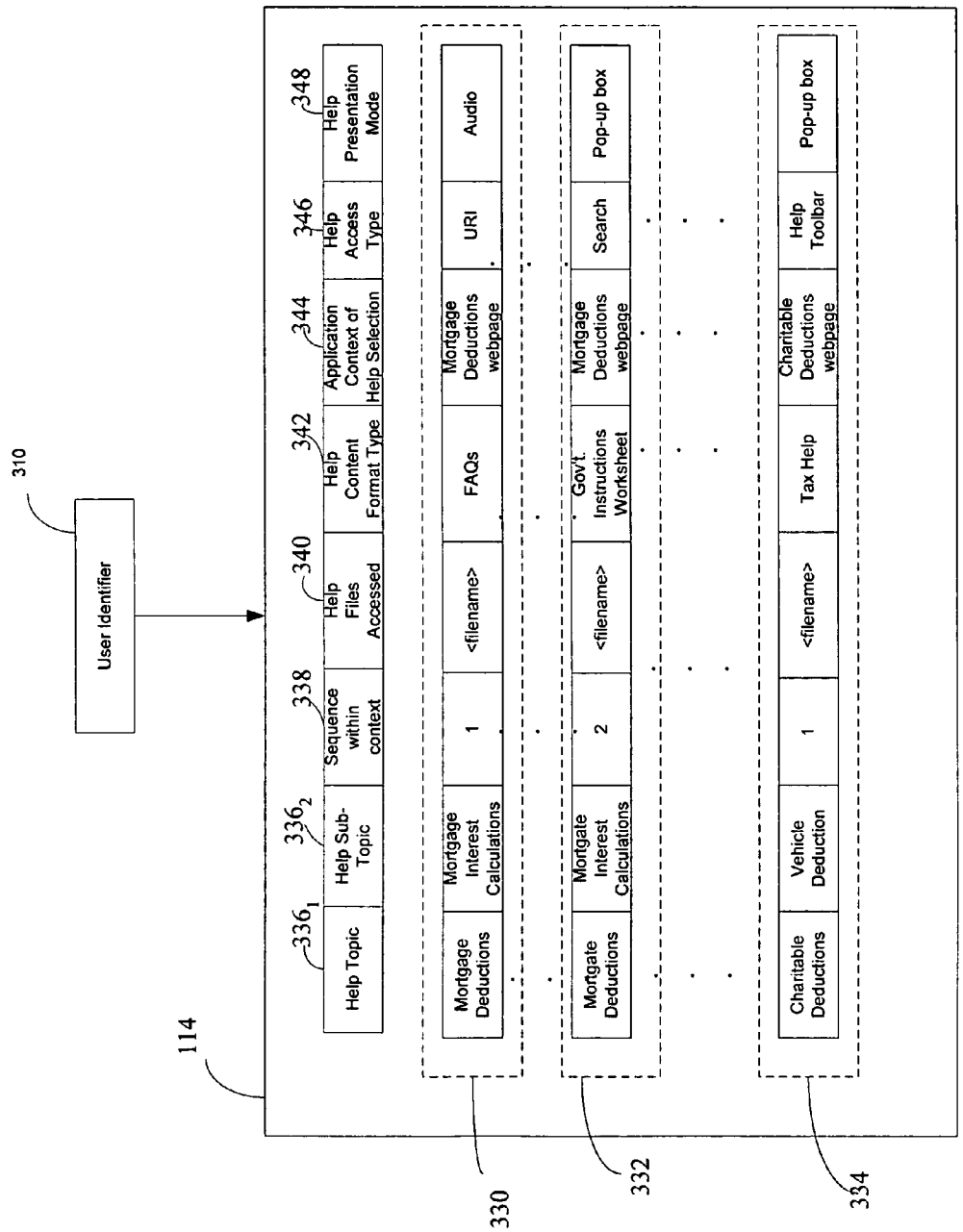
FIG. 3B illustrates an example of data tracked in a user help profile for a tax preparation software application in accordance with an embodiment of the present invention.

FIG. 3B illustrates an example of data tracked in a user help profile 114 for the tax preparation software application that is a part of a user help knowledge base 120 in accordance with an embodiment of the present invention. In this example, the help module 108 uses the user identifier 310 as a reference to the user help profile 114 for a user such as the hypothetical Mary Jane Smith. FIG. 3B illustrates three examples 330, 332, and 334 of data entries tracking previous help information selections for a particular user. For each entry, the user help profile 114 stores at least one help topic $336_1$, $336_2$ associated with the help file, the application context 344 of the help selection, an identifier 340 of the help file selected, a presentation mode 348 in which the help file was presented, a help access type 346 by which the help file was selected, a help content format type 342 of the file and a sequence identifier 338 indicating the order of selection of the help file in the application context.

In one example 330, a help file identified by its <filename> and related to the topic of mortgage deductions and the sub-topic of mortgage interest calculations was selected in the application context of the mortgage deductions web page. The help content format type was frequently asked questions (FAQs) which the user accessed through the help access type of a Uniform Resource Identifier (URI) and which was presented in audio mode. In the application context of the mortgage deductions web page, this was the first help file accessed. In another example of a data entry 332 in the user help profile 114, another help file identified by its <filename> and related to the topic of mortgage deductions and the sub-topic of mortgage interest calculations was also selected in the application context of the mortgage deductions web page. The help content format type was a government instructions worksheet which the user accessed through the help access type of a search and which was presented in a display presentation mode type of a pop-up window box. In one implementation example, the pop-up window box is formatted in accordance with a file comprising instructions for generating a web-based display. The sequence number for this help file indicates it was the second help file accessed in the mortgage deductions web page.

FIG. 3B illustrates another example of a data entry 334 for the selection of a help file identified by its <filename> and related to the topic of charitable deductions and the sub-topic of vehicle deduction. This help file was selected in the application context of a charitable deductions web page. The help content format type was tax help which presents topics for selection by a user and which the user accessed through the help access type of a help toolbar. The tax help file was also presented as a pop-up window box. In the application context of the charitable deductions web page, this was the first help file accessed.

Figure 6:
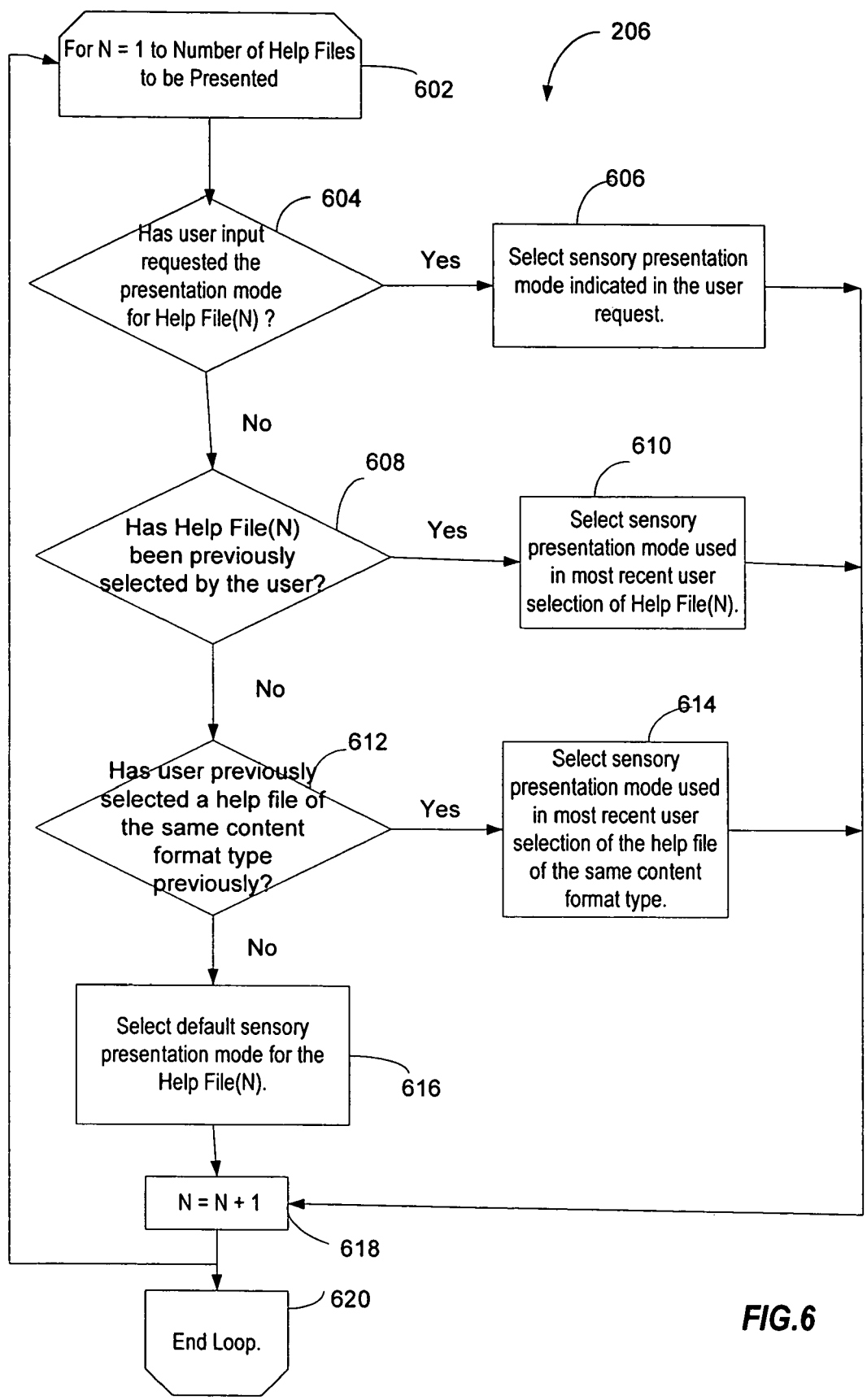
FIG. 6 illustrates a computer-implemented method for determining a presentation mode for presenting the selected help information based on a presentation mode for help information previously selected by a user in accordance with an embodiment of the present invention.
Figure 7:
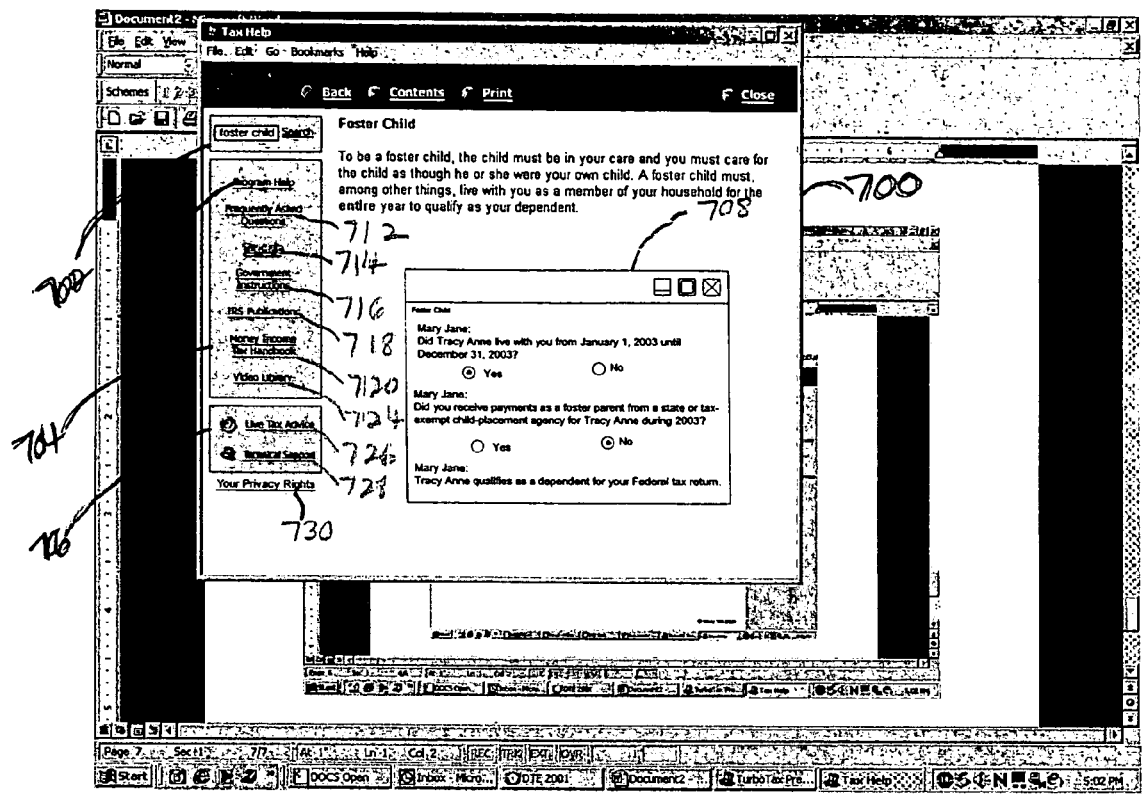
FIG. 7 illustrates an example of a help display window including examples of help content format types for help information that can be used in one or more embodiments of the present invention.

Examples of help content format types for an exemplar tax application are illustrated in FIG. 7. The examples include program help 710 which provides information on the operation of the tax application and how it processes user data, frequently asked questions (FAQs) 712, tax help 714, government instructions 716 which include state and federal government instructions for tax filing forms including worksheets, Internal Revenue Service (IRS) publications 718, a Money Income Tax Handbook 720 that provides step-by-step instructions in performing calculations for tax worksheets and forms, a video library 724 (video can be a help content format type as well as a presentation mode), live tax advice 726 in which a user can select the link and have his or her browser redirected to another website through which the user can engage in real-time contact with a tax expert, and technical support 728 and a "Your Privacy Rights 730 explaining privacy policies regarding the personal information collected by the application for a user. FIG. 7 is discussed in more detail below. For illustrative purposes only, the method embodiment illustrated in FIGS. 4, 5A, 5B and 6 are discussed in the context of the system embodiment of FIG. 1.

Figure 4:
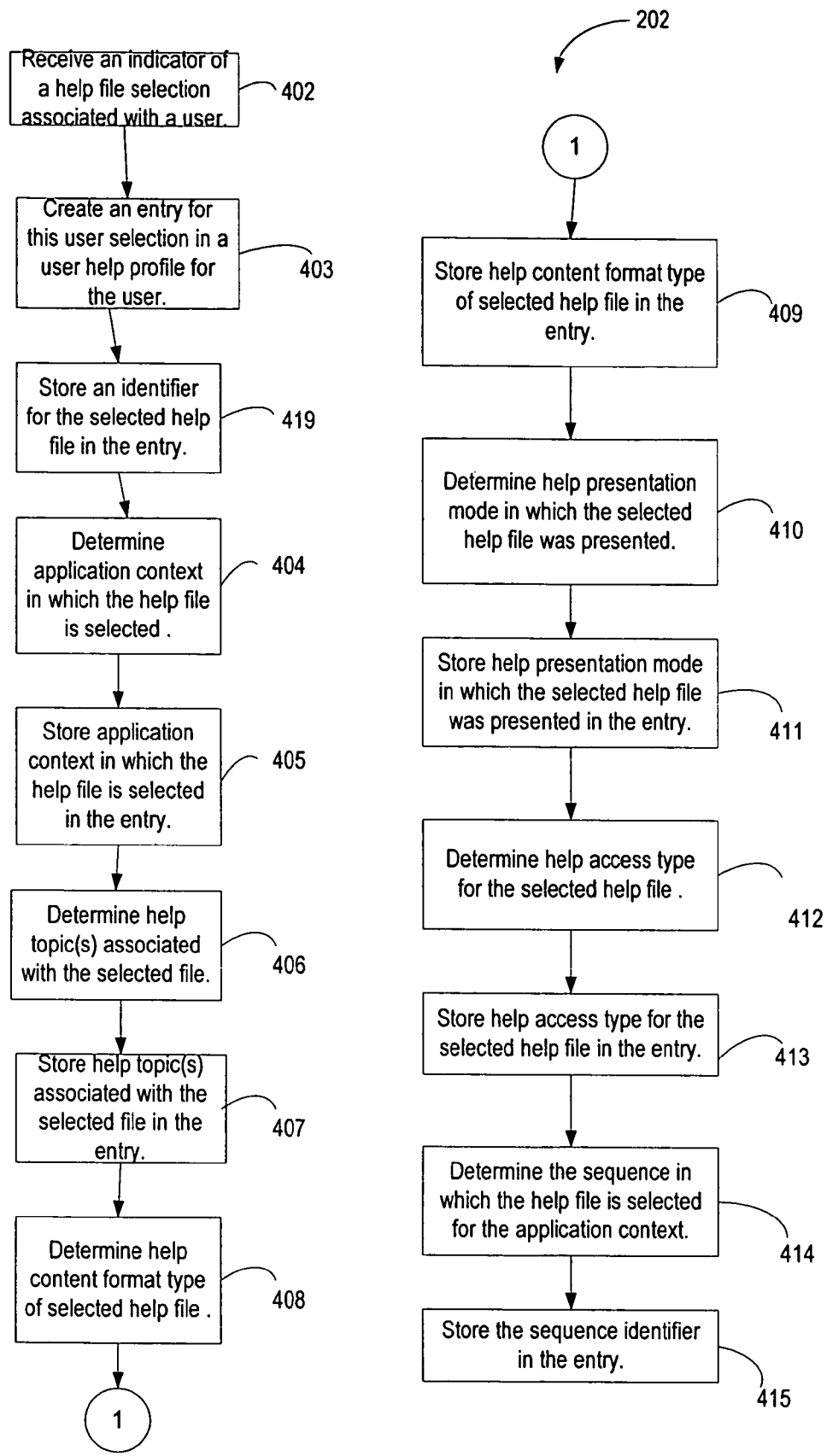
FIG. 4 illustrates a computer-implemented method for tracking help information previously selected by a user in a user help profile for a software application in accordance with an embodiment of the present invention.

FIG. 4 illustrates a computer-implemented method for tracking 202 help information previously selected by a user in a user help profile 114 for a software application in accordance with an embodiment of the present invention. The help module 108 receives 402 an indicator of user selection of a help file from the user interface 102 via the application 104, and creates 403 an entry in the user help profile 114 for this user help selection and stores 419 an identifier (e.g., a filename) for the selected help file in the entry. The help module 108 determines 404 the application context in which the help file is selected, and stores 405 this application context in the entry. In the tax application example, the application context is typically a web page, but may be another application context, for example a sub-module or a sub-routine or a library function. The help module 108 determines 406 the help topic (s) associated with the selected help file, and stores 407 the associated help topic(s) in the created user selection entry. The help module 108 determines 408 the help content format type of the selected help file and stores 409 the help content format type in the created user selection entry. The help module 108 determines 410 the help presentation mode in which the selected file was presented and stores 411 this help presentation mode in the created user selection entry. The help module 108 determines 412 the help access type for the selected help file and stores 413 the help access type in the created user selection entry. The help module 108 determines 414 the sequence in which the help file is selected for the application context, and stores 415 the sequence identifier in the created user selection entry.

Figure 5:
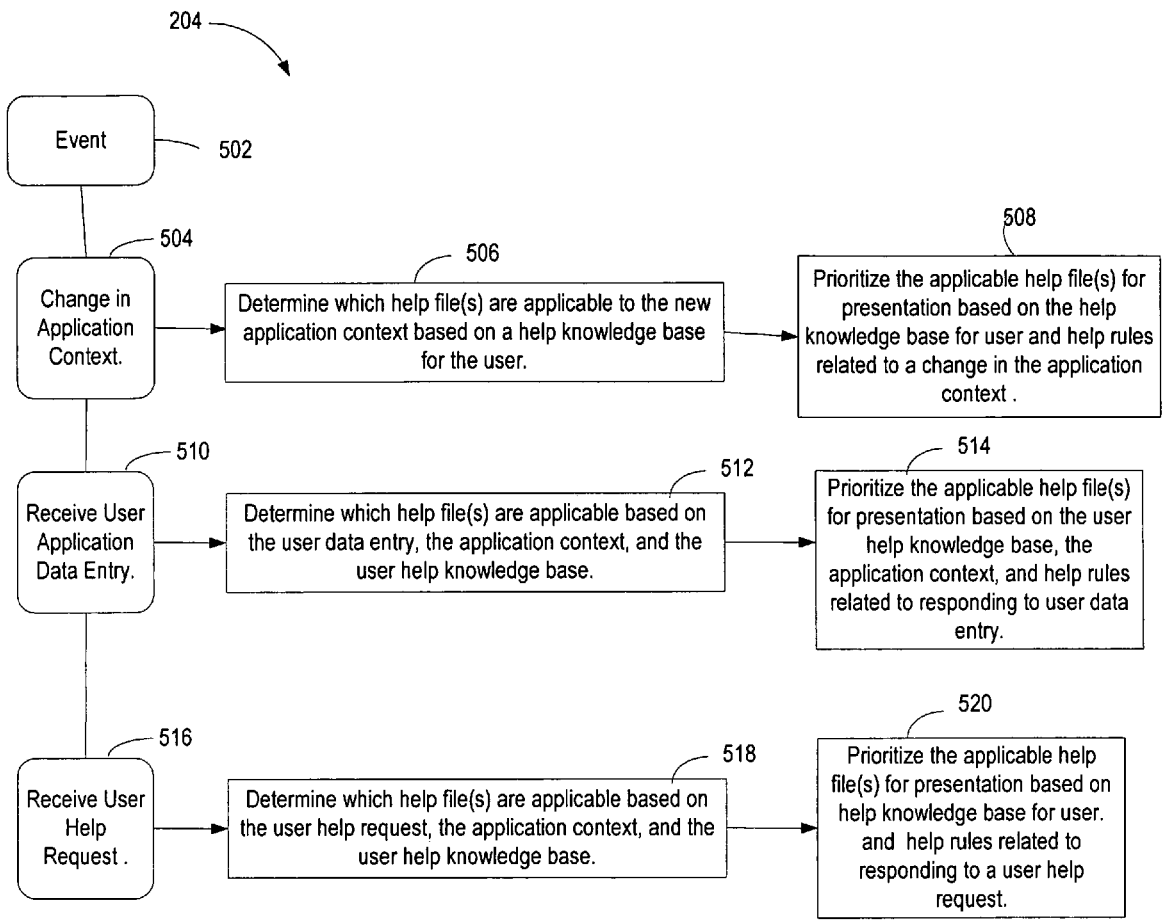
FIG. 5 illustrates a computer-implemented method for selecting help information for presentation to a user based on help information previously selected by a user in accordance with an embodiment of the present invention.

FIG. 5 illustrates a computer-implemented method 204 for selecting help information for presentation to a user based on help information previously selected by the user in accordance with an embodiment of the present invention. For illustrative purposes, FIG. 5 depicts the method embodiment 204 in an event-driven mode of operation that responds to detected events 502. Responsive to the receiving 504 a notification that the application context has changed, the help module 108 determines 506 which help files(s) are applicable to the new application context based on the user help knowledge base 120 associated with a user identifier for the user. The help module 108 prioritizes 508 the applicable help file (s) for presentation based on the user help knowledge base 120 and help rules 118 related to a change in the application context. An example of a help rule for prioritization include help files previously selected by a user in the application context resulting from the change have priority for presentation over default help files associated with this context. For example, a FAQ previously accessed during the resulting web page from the change is displayed at the top of the FAQs list on the web page. In another example of a rule, help files related to user data in the user application profile 106 that is affected by the processing in the application context or information provided in the application context has a higher priority than previously selected help files. For example, if the application context is a web page displaying a video or a display on the new tax law changes, the help module 108 determines which, if any, of the tax law changes are applicable to the user Mary Jane Smith based on her user application profile 106. A new tax law in this example allows teachers to deduct up to $250 for unreimbursed school supplies they provided to students. The application cross-references this tax law change by occupation, and the help module 108 retrieves the occupation field from Mary Jane's user application profile 106, which indicates she is a teacher. Therefore, in one scheme, the help module 108 prioritizes 508 the help file associated with this teacher reimbursement topic tax law change above any previously selected help files or default help files.

Responsive to the event of receiving 510 user application data entry, the help module 108 determines 512 which help file(s) are applicable based on the user data entry, the application context, and the user help knowledge base. The help module 108 prioritizes 514 the applicable help file(s) for presentation based on the user help knowledge base 120, the application context, and the help rules related to responding to user data entry. One example of a help rule that can be applied is that a help file previously selected in an application context at a level such as a web page or a sub-routine but not specifically related to the user data entry has priority over other help files unless the user data entry changes a data item (e.g., filing status) in the user application profile 106. In that event, help file(s) related to the changed data item have priority for presentation over the previously selected help files.

Responsive to the event of receiving 516 user input indicating a help request, the help module 108 determines which help file(s) are applicable based on the user help request, the application context and the user help knowledge base 120. The help module 108 prioritizes 520 the applicable help file (s) for presentation based on the user help knowledge base 120, the application context, and help rules 118 for responding to a user help request. An example of a help rule is that a user request for a specific help file, for example, a video on the differences between traditional IRAs and Roth IRAs, gives that help file the highest priority for presentation. In another example, a user help request (e.g., a search query) can identify a topic of interest to the user. One set of help rules that can be applied is that one or more previously selected help files related to the topic have priority for presentation than those related but not previously presented. The set of rules can further provide that if a plurality of help files related to the topic were previously selected, the previously presented files are prioritized 520 in the reverse order of the sequence selected in the application context. In other words, the last selected help file has the highest priority for presentation. In another rule example, the priority would be in reverse order of the sequence selected in the application regardless of the application context.

Another help rule that can be applied for prioritizing help files is that a help file with a higher success indicator has priority over those with lower success indicators. A success indicator indicates the degree to which the help file succeeded in assisting the user. In one example, success can be indicated as either successful or unsuccessful. Finer tuning of a success indicator can be implemented by assigning one of more than two predetermined weight values as a success indicator. A factor in setting the weight value is the degree of validity of the measuring technique or basis for determining the success of the help file in assisting the user. In one example, the application includes mechanisms to gather user input on applicability and helpfulness of the help system. Based on user feedback, a weight value is assigned to the success indicator for a help file. In one example, the mechanism is a direct query to a user regarding the helpfulness of a selected help file. User input indicating the help file answered the user's question or solved her problem or error can result in that help file being assigned a predetermined higher value than help file for which the response indicated it directed the user to another help file for the information. In another example, overt user action is used as a measure of the success of a help file in assisting a user. For example, the following actions can be used to indicate that a high success weigh value should be assigned by the help module 108 to a help file for this user.

The application context in which the help file was selected indicates that the user had clicked a field entry box on a web page but had not entered data when the user accessed a particular help file. The user input indicates that the user closed a window displaying the contents of the help file and proceeded, without opening any other help files, to enter data in the field entry box. The application 104 receives the entered data and determines it is error free and notifies the help module 108 of the lack of errors. These user actions indicate the help content was successful. A predetermined success indicator weight can be assigned for this measurement technique based on overt user action. In another example, no further help being sought in an application context can indicate a degree of success in helping a user, however the validity of this measurement basis is lower than for user input indicating an explicit response that the help file answered the question or an error free data entry after consulting a help file. In the binary approach, the success indicator can be set to successful. If the weighted value approach is used the weight value can indicate success to a lower degree because this technique can be considered not as accurate as the other bases for measuring success.

Examples of prioritizing 508, 514, 520 help information are presented in the context of the tax preparation application, however, similar techniques are applicable to other types of applications as well.

FIG. 6 illustrates a computer-implemented method 206 for determining a presentation mode for presenting the selected help information based on a presentation mode for the help information previously selected by a user in accordance with an embodiment of the present invention. For 602 each of the N help files to be presented, the help module 108 determines 604 whether user input has requested the presentation mode for the respective help file. Responsive to a positive determination 604, the help module 108 selects 606 the presentation mode indicated in the user request, and increments 618 counter N. Responsive to a negative determination 604, the help module 108 determines 608 whether the help file (N) has been previously selected by the user as indicated, for example, in the user help profile 114 for the user. Responsive to a positive determination 608, the help module 108 selects 610 the presentation mode used in the most recent user selection of help file(N), and increments 618 counter N. Responsive to a negative determination 608, the help module 108 determines 612 whether the user has previously selected a help file of the same help content format type as the current help file (N). Responsive to a positive determination 612, the help module 108 selects 614 the same presentation mode as used in the most recent user selection of the help file of the same content format type, and increments 618 counter N. Responsive to a negative determination 612, the help module 108 selects 616 a default presentation mode for the current help file (N), and increments 618 counter N. In one example, a default presentation mode is associated with each help content format type which can be applied to files of that help content format type. Once all the indicated help files have been processed, the loop ends 620.

The help module 108 indicates the selected help files and their presentation modes to the user interface 102 which is one example is a browser for presentation on an output device such as a computer screen. A user can access the presented help files through access mechanisms. Examples of an access mechanism include a link (e.g., URI or URL), a voice activated link, or a pop-up display window. As an illustrative example, an access mechanism can be a displayed link with a speaker icon to a FAQ audio file. In one embodiment, the presenting 208 of the access mechanisms for the selected help files is in accordance with the presentation priority established for the help files. For example, a link to the FAQ with the highest priority is displayed at the top of the FAQs list of links.

FIG. 7 illustrates an example of a help display window 700 associated with a tax preparation application, including examples of help content format types for help information and access mechanisms for selecting help information that can be used in one or more embodiments of the present invention. The help display window 700 comprises a search entry field 702, a sub-window or panel 704 listing various examples of help content formats, and another sub-window or panel 706 listing other examples of help content formats. The search entry field 702 provides a data entry block in which a sample query for "foster child" has resulted in a tax help 714 file being presented in a display mode including a pop-up box 700 illustrating text about a foster child qualifying as a dependent. In this example, the help content format of the displayed help information on a foster child qualifying as a dependent is "Tax Help," 714 which includes short summaries on tax related topics. The help content format type "Program Help" 710 includes help files on topics related to technical support questions for the tax application and general program usage such as downloading application updates, adding a form to a user's return, and navigating from the user's federal tax return to the user's state tax return. Another help content format type is Frequently Asked Questions 712 which are presented using links with text in the form of a question mark as access mechanisms. In this example, FAQs can link to a tax help text pop-up box on the same topic. Another example of a help content format type is third-party help information. For example, the tax preparation application includes government instructions 716 help files on various topics, as well as links to IRS publications 718. Another help content format type is the Money Income Tax Handbook 720 that provides step-by-step instructions in performing calculations for tax worksheets and forms. The video library 724 provides videos on various tax-related topics. In one aspect, a video is a help content format, and in another aspect it is a presentation mode. Other help content format types include "Live Tax Advice" 726 in which a user can select the link and have his or her browser redirected to another website through which the user can engage in real-time contact with a tax expert. Technical support 728 is an example of a help content format type which in this example is also a subset of program support. "Your Privacy Rights" 730 is an example of a help content format type having a display mode of text including paragraphs explaining privacy policies regarding the personal information collected by the application for a user. An example of an interactive help content format type 708 of including questions and answers presented in a textual display mode is illustrated in a pop-up box 708. A user responds to one or more queries. Responsive to the answers received in user input, the help module 108 selects more questions, provides an answer, or can direct the user to another help file or help source to find the answer. The interactive help information in the pop-up box 708 further illustrates how help information content can be personalized based on data specific to the user processed by the application. In the example of FIG. 1, based on Mary's query on "foster child," the help module 108 determines searches Mary's user application profile 106 to see if Mary has any dependents with a relationship of foster child. Tracy Anne Jones is the name stored in the dependent data entry 318 with a relationship of foster child. The help module 108 identifies or imbeds "Mary Jane" and "Tracy Anne" in the appropriate fields for the display of the interactive help file in the pop-up box 708 to personalize the help content for Mary. Responsive to user input of selecting the "Yes" button indicating Tracy Anne lived with Mary Jane from Jan. 1, 2003 through Dec. 31, 2003, the help module 108 presents a follow-up question to Mary Jane regarding the second requirement for claiming a foster child as a dependent on a federal return, "Did you receive payments as a foster parent from a state or tax-exempt child-placement agency for Tracy Anne during 2003?" In this example, Mary Jane's user input selection of the "No" button indicates Tracy Anne qualifies as her dependent, and the this answer is indicated in the displayed text "Tracy Anne qualifies as a dependent for your Federal tax return."

Figure 8A:
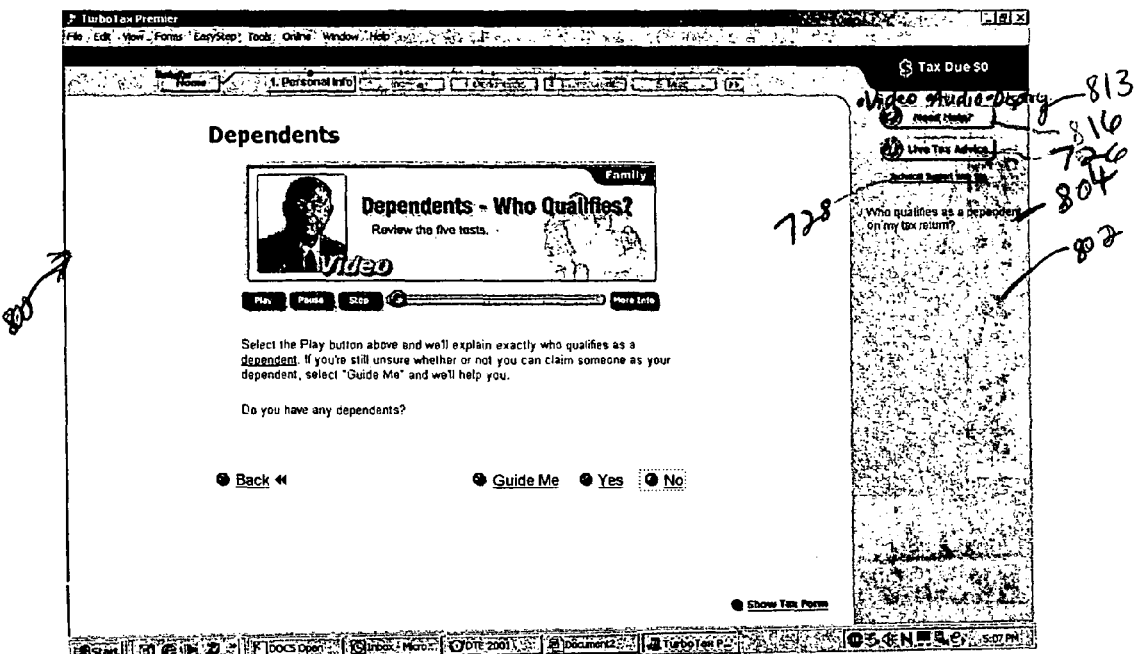
FIGS. 8A and 8B illustrate examples of a help display resulting from the selection of help information based on an example user application profile, an example user help profile, and an example application context in accordance with an embodiment of the present invention.

FIG. 8A illustrates an example of a help display window 800 for a current application window that can result when a user help profile 114 and a user application profile 106 have been created for a new user in accordance with an embodiment of the present invention. For FIGS. 8A and 8B, Mary Jane Smith is the exemplar user. This example is in the application context of a web page for "Dependents" in the exemplar tax preparation application 104. In this example, this is Mary Jane's first time using the application 104 and she has entered no user data regarding dependents so the application 104 provides a FAQ typically helpful to users of the program in general as there is insufficient data in the user help knowledge base 120 to provide other examples. The web page 800 includes a help display area or window including selectors 813, for example buttons, for selecting a presentation mode for help information of "Video," "Audio" or "Display." In addition to selection buttons 813, there is an access mechanism in the form of a link for a general help inquiry identified by the text "Need Help?" 806 and beneath another link for "Live Tax Advice," 726 there is a link for a Technical Support Web Site 728 and another link 804 to a FAQ file, the link 804 being presented to display text in the form of a question, "Who qualifies as a dependent on my tax return?"

Figure 8B:
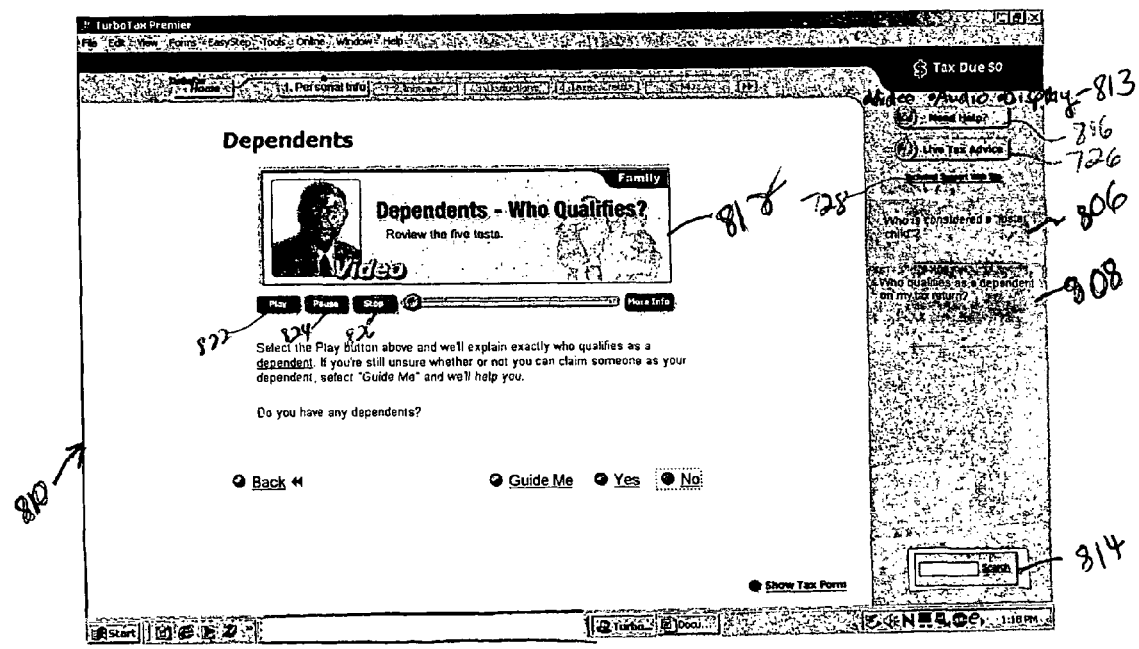

FIG. 8B illustrates another example of a help display window 810 generated by the help module 108 based on the existing user help knowledge base 120 for Mary Jane Smith including a user help profile 114 and a user application profile 106 in accordance with an embodiment of the present invention. In this example, this is the second year that Mary Jane Smith is using the tax preparation application 104. The help module 108 reads Mary's user help profile 114 which she stored last year on her personal computer's hard disk. As Mary navigates to the "Dependents" web page, the application context change is detected. From Mary's user help profile 114, the help module 108 determines 506 that Mary previously selected an FAQ related to the topic of foster child entitled "Who is considered a foster child?" in the Dependents web page. The help module 108 determines 506 that this FAQ file is a previously accessed help file during the current application context of the Dependents web page. Another applicable FAQ 808 that was displayed last year is also determined 506 to be an applicable help file. The help module 108 prioritizes 508 these FAQ help files according to the rule that previously presented help files have priority. As a result of the rule's application, the link 806 for the FAQ entitled "Who is considered a foster child?" is listed above the default FAQ link 808 "Who qualifies as a dependent on my tax return?" The help module 108 also determined that a video file "Dependents—Who Qualifies?" is also applicable and includes a pop-up box 812 for accessing the video.

Mary accesses the tax help pop-up window 700 as a result of a help access type of a search query for "foster child" as illustrated in FIG. 7. A data entry for this tax help file selection is created in Mary's user help profile 114. With the addition of this entry, the help module 108 determines that Mary has used a search query to locate help information most often. The help module 108, in this example, applies a help rule 118 that the user's most common help access type mechanism is accessible in the display throughout the application 104 regardless of context. A search entry field box 814 is displayed by the help module 108 in accordance with this rule.

Figure 9:
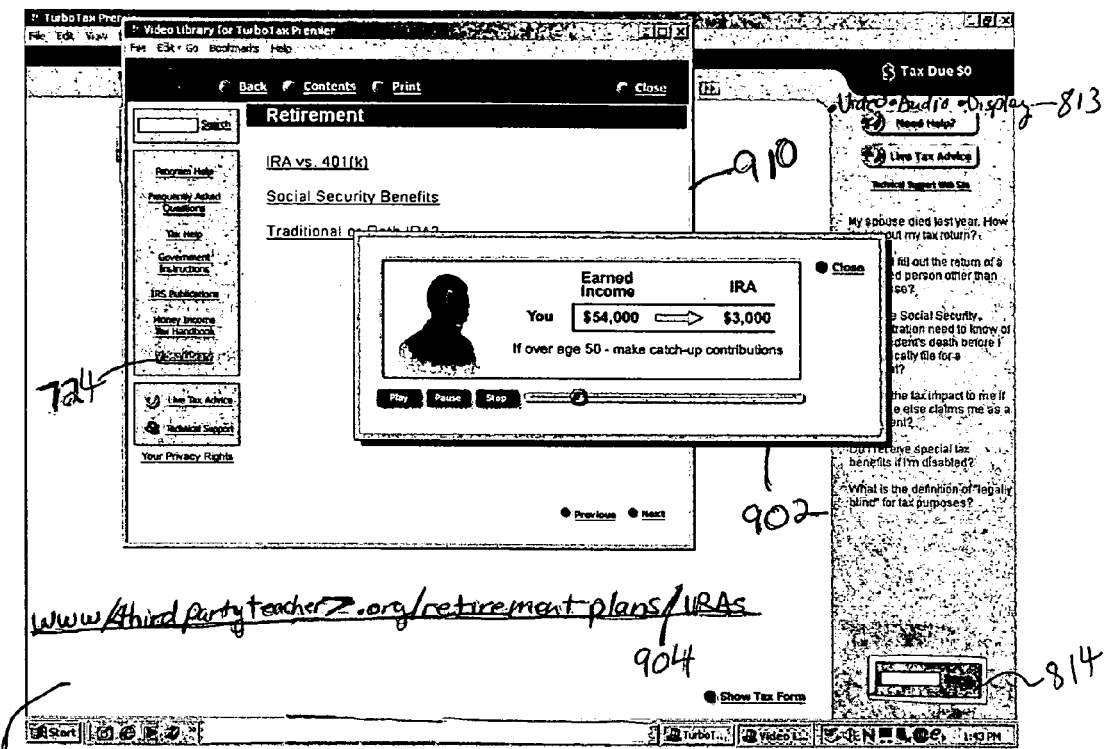
FIG. 9 illustrates another example of a help display illustrating a video presentation mode and a third-party service link selected in accordance with an embodiment of the present invention.

FIG. 9 illustrates another example of a help display illustrating a video presentation mode 902 for a help file 902 and a third-party service link 904 selected in accordance with an embodiment of the present invention. Mary Jane Smith selects a retirement video from the video library 725 of help files. The help module 108 receives Mary's help request 516 for the video related to IRAs indicated by activation of the link entitled "Traditional or Roth IRA?". The help module 108 determines 518 the help files applicable to the topic of IRAs, and prioritizes 520 the applicable help files for presentation during the current application context of a retirement pop-up box 910. In addition to the video file indicated in Mary's request, one of the help files indicated for presentation based on her user help knowledge base 120 is a third-party teacher organization's file for IRAs under its retirement plans. Based on Mary Jane Smith's entry 304 of occupation as a high school teacher and the topic of her help request, the help module 108 determines 518 that the third-party file is applicable as well. The help module 108 determines the presentation mode of the prioritized help files. For the video, based on Mary's user input for a video file, the video 902 is displayed in pop-up box 902 and the access mechanism 904 for the third-party IRAs for teachers is a link 904 www.<thirdpartyteacher>.org/retirementplans/IRAs. In this example, Mary's user help profile 114 has continued to accumulate data entries for help selections accessed through a search query. Therefore, the search entry field 814 is displayed in this user interface display as well in accordance with the help access rule example discussed for FIG. 8B above.

The foregoing description of the embodiments of the present invention has been presented for the purposes of illustration and description. The present invention can be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module or an application, of the present invention is implemented as software, the component can be implemented in a variety of ways examples of which include a standalone program, as part of a larger program, as a plurality of separate programs, as a statically or dynamically linked library, as a kernel loadable module, as a device driver.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method of providing help information for a tax software application having a plurality of user interface screens, the method comprising:

determining, by a hardware processor and during a current session of the tax software application, an application context of the tax software application displayed to a user, wherein the application context comprises a user interface screen of the plurality of user interface screens;

retrieving, by the hardware processor and during the current session, a plurality of database entries corresponding to the application context and identifying a plurality of help files accessed by the user during a previous session of the tax software application;

assigning, by the hardware processor and during the current session, a plurality of priority values to the plurality of help files, wherein assigning the plurality of priority values comprises:

accessing a user profile in the tax software application for the user, identifying an itemized income tax deduction of the user from the user profile, identifying a first help file of the plurality of help files corresponding to the itemized tax deduction of the user, and assigning a first priority value to the first help file and a second priority value to a second help file of the plurality of help files, wherein the first priority value exceeds the second priority value in response to the first help file corresponding to the itemized income tax deduction of the user; and presenting, by the hardware processor and during the current session, the plurality of help files to the user according to the plurality of priority values.

2. The method of claim 1, further comprising:

receiving a user navigation request to navigate to the user interface, wherein the application context is determined in response to the user navigation request, and wherein the user interface is a webpage.

3. The method of claim 1, wherein assigning the plurality of priorities further comprises:

identifying an occupation of the user from the user profile;

identifying a third help file of the plurality of help files corresponding to the occupation; and assigning a third priority value to the third help file and a fourth priority value to a fourth help file of the plurality of help files, wherein the third priority value exceeds the fourth priority value in response to the third help file corresponding to the occupation of the user.

4. The method of claim 1, wherein assigning the plurality of priorities further comprises:

identifying a marital status of the user from the user profile;

identifying a third help file of the plurality of help files corresponding to the martial status of the user; and assigning a third priority value to the third help file and a fourth priority value to a fourth help file of the plurality of help files, wherein the third priority value exceeds the fourth priority value in response to the third help file corresponding to the marital status of the user.

5. The method of claim 1, wherein assigning the plurality of priorities further comprises:

identifying, from the plurality of database entries, a presentation order of the plurality of help files during the previous session;

identifying an initial help file and a final help file in the presentation order; and reversing the presentation order by assigning a third priority value to the final help file and a fourth priority value to the initial help file, wherein the third priority value exceeds the fourth priority value.

6. The method of claim 1, further comprising:

receiving, during the previous session, a valid input from the user for the application context; and identifying a third help file displayed to the user immediately before receiving the valid input, wherein assigning the plurality of priorities further comprises assigning the third help file a third priority value and a fourth help file a fourth priority value, and wherein the third priority value exceeds the fourth priority value in response to the third help file being displayed immediately before receiving the valid input.

7. The method of claim 1, wherein presenting the plurality of help files comprises:

displaying, within the user interface, a plurality of web links corresponding to the plurality of help files in an order defined by the plurality of priorities.

8. The method of claim 1, wherein presenting the plurality of help files comprises:

accessing a database entry of the plurality of database entries corresponding to the first help file of the plurality of help files;

identifying, from the database entry, a presentation mode used during the previous session to present the first help file to the user; and presenting, during the current session, the first help file to the user in the presentation mode recorded by the database entry.

9. A computer readable storage medium having computer readable program code embodied therein, the computer readable program code adapted to, when executed by a hardware processor, implement a method of providing help information for a tax software application having a plurality of user interface screens, the method comprising:

determining, during a current session of the tax software application, an application context of the tax software application displayed to a user, wherein the application context comprises a user interface screen of the plurality of user interface screens;

retrieving, during the current session, a plurality of database entries corresponding to the application context and identifying a plurality of help files accessed by the user during a previous session of the tax software application;

assigning, during the current session, a plurality of priority values to the plurality of help files, wherein assigning the plurality of priority values comprises:

accessing a user profile in the tax software application for the user, identifying an itemized income tax deduction of the user from the user profile, identifying a first help file of the plurality of help files corresponding to the itemized tax deduction of the user, and assigning a first priority value to the first help file and a second priority value to a second help file of the plurality of help files, wherein the first priority value exceeds the second priority value in response to the first help file corresponding to the itemized income tax deduction of the user; and presenting, during the current session, the plurality of help files to the user according to the plurality of priority values.

10. The computer readable storage medium of claim 9, the method further comprising:

receiving a user navigation request to navigate to the user interface, wherein the application context is determined in response to the user navigation request, and wherein the user interface is a webpage.

11. The computer readable storage medium of claim 9, wherein assigning the plurality of priorities further comprises:

identifying an occupation of the user from the user profile;

identifying a third help file of the plurality of help files corresponding to the occupation; and assigning a third priority value to the third help file and a fourth priority value to a fourth help file of the plurality of help files, wherein the third priority value exceeds the fourth priority value in response to the third help file corresponding to the occupation of the user.

12. The computer readable storage medium of claim 9, wherein assigning the plurality of priorities further comprises:

identifying a marital status of the user from the user profile;

identifying a third help file of the plurality of help files corresponding to the marital status of the user; and assigning a third priority value to the third help file and a fourth priority value to a fourth help file of the plurality of help files, wherein the third priority value exceeds the fourth priority value in response to the third help file corresponding to the marital status of the user.

13. The computer readable storage medium of claim 9, wherein assigning the plurality of priorities further comprises:

identifying, from the plurality of database entries, a presentation order of the plurality of help files during the previous session;

identifying an initial help file and a final help file in the presentation order; and reversing the presentation order by assigning a third priority value to the final help file and a fourth priority value to the initial help file, wherein the third priority value exceeds the fourth priority value.

14. The computer readable storage medium of claim 9, the method further comprising:

receiving, during the previous session, a valid input from the user for the application context; and identifying a third help file displayed to the user immediately before receiving the valid input, wherein assigning the plurality of priorities further comprises assigning the third help file a third priority value and a fourth help file a fourth priority value, and wherein the third priority value exceeds the fourth priority value in response to the third help file being displayed immediately before receiving the valid input.

15. The computer readable storage medium of claim 9, wherein presenting the plurality of help files comprises:

displaying, within the user interface, a plurality of web links corresponding to the plurality of help files in an order defined by the plurality of priorities.

16. The computer readable storage medium of claim 9, wherein presenting the plurality of help files comprises:

accessing a database entry of the plurality of database entries corresponding to the first help file of the plurality of help files;

identifying, from the database entry, a presentation mode used during the previous session to present the first help file to the user; and presenting, during the current session, the first help file to the user in the presentation mode recorded by the database entry.

17. A computer system, comprising:

a hardware processor;

a physical memory operatively connected to the hardware processor; and a plurality of software instructions stored in the physical memory and comprising functionality, when executed by the hardware processor, to implement a method of providing help information for a tax software application having a plurality of user interface screens, the method comprising:

determining, during a current session of the tax software application, an application context of the tax software application displayed to a user, wherein the application context comprises one of a plurality of user interface screens of the tax software application;

retrieving, during the current session, a plurality of database entries corresponding to the application context and identifying a plurality of help files accessed by the user during a previous session of the tax software application;

assigning, by the hardware processor and during the current session, a plurality of priority values to the plurality of help files, wherein assigning the plurality of priority values comprises:

accessing a user profile in the tax software application for the user, identifying an itemized income tax deduction of the user from the user profile, identifying a first help file of the plurality of help files corresponding to the itemized tax deduction of the user, and assigning a first priority value to the first help file and a second priority value to a second help file of the plurality of help files, wherein the first priority value exceeds the second priority value in response to the first help file corresponding to the itemized income tax deduction of the user; and presenting, during the current session, the plurality of help files to the user according to the plurality of priority values.

18. The computer system of claim 17, the method further comprising:

receiving a user navigation request to navigate to the user interface, wherein the application context is determined in response to the user navigation request, and wherein the user interface is a webpage.

19. The computer system of claim 17, wherein assigning the plurality of priorities further comprises:

identifying an occupation of the user from the user profile;

identifying a third help file of the plurality of help files corresponding to the occupation; and assigning a third priority value to the third help file and a fourth priority value to a fourth help file of the plurality of help files, wherein the third priority value exceeds the fourth priority value in response to the third help file corresponding to the occupation of the user.

20. The computer system of claim 17, wherein assigning the plurality of priorities further comprises:

identifying a marital status of the user from the user profile;

identifying a third help file of the plurality of help files corresponding to the marital status of the user; and assigning a third priority value to the third help file and a fourth priority value to a fourth help file of the plurality of help files, wherein the third priority value exceeds the fourth priority value in response to the third help file corresponding to the marital status of the user.

21. The computer system of claim 17, wherein assigning the plurality of priorities further comprises:

identifying, from the plurality of database entries, a presentation order of the plurality of help files during the previous session;

identifying an initial help file and a final help file in the presentation order; and reversing the presentation order by assigning a third priority value to the final help file and a fourth priority value to the initial help file, wherein the third priority value exceeds the fourth priority value.

22. The computer system of claim 17, further comprising:

receiving, during the previous session, a valid input from the user for the application context; and identifying a third help file displayed to the user immediately before receiving the valid input, wherein assigning the plurality of priorities further comprises assigning the third help file a third priority value and a fourth help file a fourth priority value, and wherein the third priority value exceeds the fourth priority value in response to the third help file being displayed immediately before receiving the valid input.

23. The computer system of claim 17, wherein presenting the plurality of help files comprises:

displaying, within the user interface, a plurality of web links corresponding to the plurality of help files in an order defined by the plurality of priorities.

24. The computer system of claim 17, wherein presenting the plurality of help files comprises:

accessing a database entry of the plurality of database entries corresponding to the first help file of the plurality of help files;

identifying, from the database entry, a presentation mode used during the previous session to present the first help file to the user; and presenting, during the current session, the first help file to the user in the presentation mode recorded by the database entry.

* * * * *